United States Patent [19]

Tanaka et al.

[11] Patent Number: 5,726,719
[45] Date of Patent: Mar. 10, 1998

[54] PROJECTION-TYPE COLOR DISPLAY DEVICE

[75] Inventors: Naoyuki Tanaka, Tenri; Hiroshi Hamada, Nara; Hiroshi Nakanishi, Sakurai; Hideki Ohshima, Nasu-gun, all of Japan

[73] Assignee: Sharp Kabushiki Kaisha, Osaka, Japan

[21] Appl. No.: 536,815

[22] Filed: Sep. 29, 1995

[30] Foreign Application Priority Data

Oct. 17, 1994 [JP] Japan .................. 6-250704

[51] Int. Cl.$^6$ .................. G02F 1/1335
[52] U.S. Cl. .................. 349/8; 349/114
[58] Field of Search .................. 359/40, 41, 42; 349/8, 114

[56] References Cited

U.S. PATENT DOCUMENTS

| | | | |
|---|---|---|---|
| 4,620,791 | 11/1986 | Combastet | 359/40 |
| 5,161,042 | 11/1992 | Hamada | 359/40 |
| 5,359,440 | 10/1994 | Hamada et al. | 359/40 |
| 5,537,171 | 7/1996 | Ogino et al. | 353/122 |
| 5,541,746 | 7/1996 | Hamagishi et al. | 359/40 |

FOREIGN PATENT DOCUMENTS

| | | | |
|---|---|---|---|
| 425-251 | 5/1991 | European Pat. Off. | 359/40 |
| 55-135808 | 10/1980 | Japan . | |
| 59-230383 | 12/1984 | Japan . | |
| 61-64158 | 4/1986 | Japan . | |
| 2-297992 | 4/1990 | Japan | 359/41 |
| 3-248125 | 11/1991 | Japan . | |
| 460538 | 2/1992 | Japan . | |
| 5-346566 | 12/1993 | Japan | 359/40 |
| 6-186521 | 7/1994 | Japan . | |
| 7181487 | 7/1995 | Japan . | |

OTHER PUBLICATIONS

M. Oikawa et al., APPLIED OPTICS, vol. 21, No. 6, pp. 1052-1056, 1982, "Distributed-Index planar microlens".
M. Oikawa et al., ELECTRONIC LETTERS, vol. 17, No. 13, pp. 452-454, 1981, "Distributed-Index Planar Microlens Array Prepared From Deep Electromigration".
Z.D. Popovic et al., APPLIED OPTICS, vol. 27, No. 7, pp. 1281-1284, 1988 "Technique for monolithic fabrication of microlens arrays".

*Primary Examiner*—William L. Sikes
*Assistant Examiner*—Tiep H. Nguyen
*Attorney, Agent, or Firm*—David G. Conlin; John L. Welch; William J. Daley, Jr.

[57] ABSTRACT

The projection-type color display device of the invention includes: a white light source; a splitting means for splitting white light emitted from the white light source into a first, a second, and a third beam having respectively different wavelength regions; a modulation means for modulating the first, the second and the third beams; an irradiation means for irradiating the first, the second and the third beams onto a principal surface of the modulation means at respectively different angles; and a projection means for projecting the first, the second and the third beams modulated by the modulation means. In the projection-type color display device, the first beam includes a color beam having a weakest intensity among the beams in three primary colors contained in the white light; and a direction of the first beam incident onto the principal surface of the modulation means is closer to a normal of the principal surface of the modulation means as compared with the second and the third beams.

15 Claims, 11 Drawing Sheets

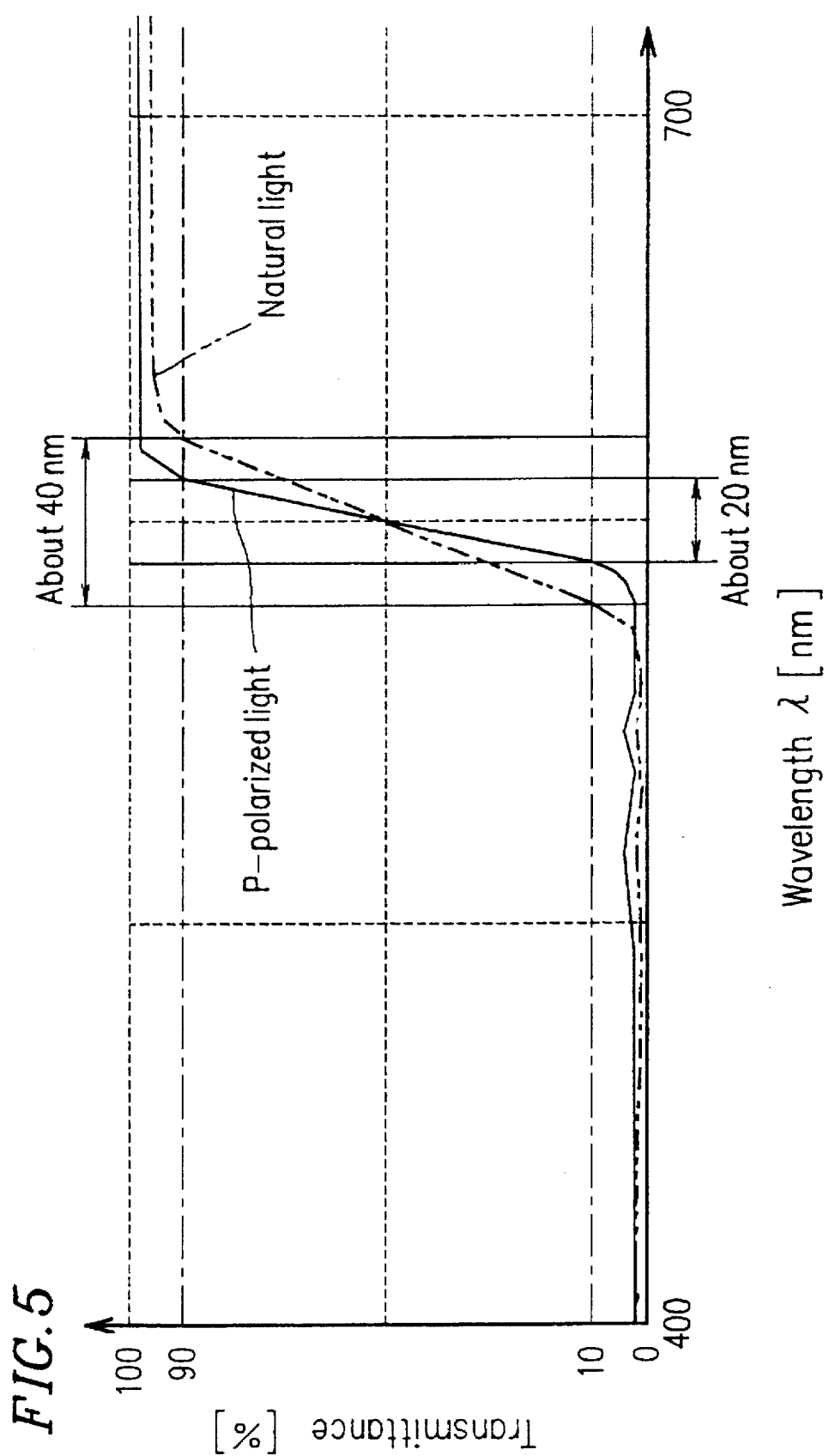

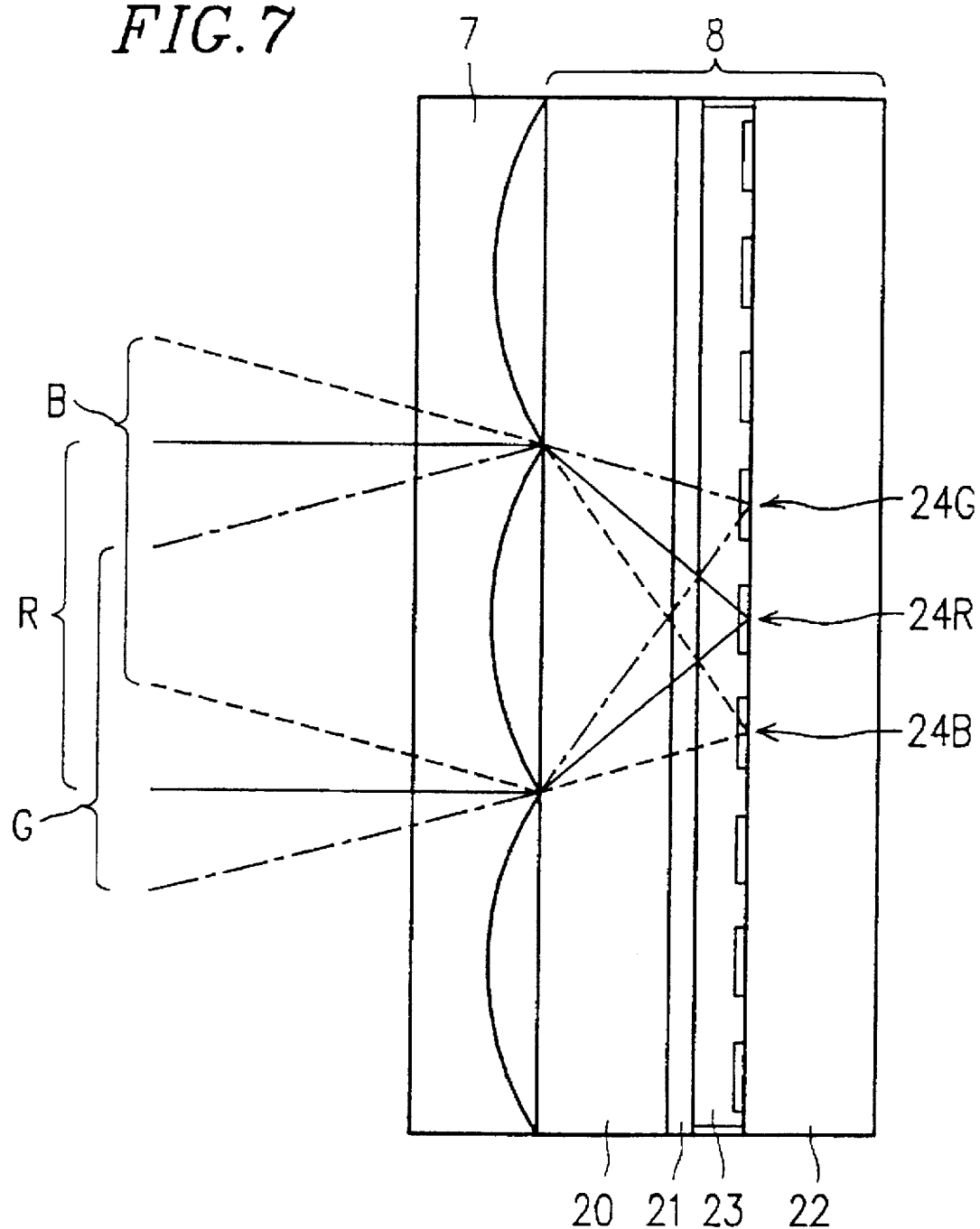

1

PROJECTION-TYPE COLOR DISPLAY DEVICE

BACKGROUND OF THE INVENTION

1. Field of the Invention

The present invention relates to a single-panel mode projection-type color display device for performing a color display by using a single liquid crystal display panel without using a mosaic-shaped color filter layer. More specifically, the present invention relates to a projection-type color display device applicable to a small-sized projection-type liquid crystal television system and an information display system.

2. Description of the Related Art

A display device such as a liquid crystal display device (LCD) does not emit light by itself, and therefore a light source is required to be provided separately. However, a projection-type color LCD has various advantageous features as compared with a projection-type cathode-ray tube (CRT) display device. More particularly, a projection-type color LCD allows for reproducing colors in a wider range; is excellent in portability since the device is small-sized and light-weight; and can eliminate the necessity of adjusting a convergence because the device is not affected by geomagnetism. In view of these advantages, further development of a projection-type color LCD is expected.

In order to display a color image by the use of a projection-type LCD, it is possible to use either a three-panel mode in which three liquid crystal display panels corresponding to the three primary colors of red (R), green (G) and blue (B) are used, or a single-panel mode in which only one liquid crystal display panel is used. According to the former three-panel mode, three optical systems and three liquid crystal display panels are provided so as to form three pairs corresponding to the three primary colors. The three optical systems split white light into the color beams in R, G and B, respectively, so as to apply the color beams to their corresponding liquid crystal display panels. The three liquid crystal display panels respectively receive and control the colors beams so as to form color images. In the three-panel mode, a full-color display is conducted by optically imposing the respective three primary colors images. The three-panel mode has advantages in that the light emitted from a white light source can be utilized very efficiently, and that the resulting color purity is satisfactorily high. However, in such a mode, since color splitting systems and color mixing systems are required to be provided as described above, the arrangement of the optical systems becomes disadvantageously complicated and the number of the necessary optical members adversely increases. Therefore, for reducing the cost and downsizing the device, the three-panel mode is generally inconvenient as compared with the single-panel mode to be described below.

On the other hand, in the latter single-panel mode, only one liquid crystal display panel is used, and an image is projected through the liquid crystal display panel including a color filter pattern in a mosaic shape, a stripe shape, or the like for the three primary colors by using a projection optical system. Such a single-panel mode projection-type LCD is disclosed, for example, in Japanese Laid-Open Patent Publication No. 59-230383. Since only one liquid crystal panel is necessary in the single-panel mode and the arrangement of the optical systems is less complicated than that of the three-panel mode, the single-panel mode is suitable for realizing a smaller-sized projection type system at a lower cost.

However, in the single-panel mode, the light is absorbed or reflected by the color filter layer, so that only one-third of the incident light can be utilized. In other words, in the single-panel mode using a color filter layer, the brightness of the image displayed on the screen is adversely reduced to about one-third as compared with the case of displaying an image from the light source with the same illuminance by a three-panel mode.

In order to solve such problems, for example, Japanese Laid-Open Patent Publication No. 4-60538 suggests a single-panel mode color liquid crystal display device in which white light emitted from a white light source 1 is split into respective beams of the three primary colors of R, G and B by using dichroic mirrors 12R, 12G and 12B configured in a fan shape so as to improve the efficiency in utilizing the light, as shown in FIG. 2.

In this device, the respective beams split by the dichroic mirrors 12R, 12G and 12B are incident onto a microlens array 7, disposed on the light source side of the LCD 8, at respectively different incident angles. The respective beams pass through the microlens array 7, and are then irradiated onto liquid crystal portions driven by signal electrodes to which the color signals corresponding to the respective color beams are independently supplied, in accordance with the incident angles of the respective beams. This device can eliminate the necessity of using an absorption-type color filter layer, thereby improving the efficiency in utilizing the light and providing an extremely bright image.

Japanese Patent Application No. 5-328805 assigned to the same assignee proposed a projection-type color liquid crystal display device which prevents the color mixing caused by the wavelength selectivity dependence of the dichroic mirrors on the incident angles. In the LCD proposed in the application, white light is split into the three primary colors in accordance with the order of the wavelength of incident light, i.e., in the order of R, G and B beams. As a result, the generation of the stray lights M' and N' caused by the shift in the characteristics of the dichroic mirrors 13L, 13M, 13N due to the incident angle differences as shown in FIGS. 4A and 4B is suppressed to a minimal level, thereby improving the color purity. With this method, by splitting the light according to wavelength from long to short, i.e., in the order of Red (R), Green (G) and Blue (B), which correspond to L, M, N in FIG. 4A and 4B; it is possible to substantially eliminate the generation of the stray lights M' and N', which are likely to be generated because of the reasons mentioned above. Therefore, it is possible to obtain an image in which the resulting color purity of the split beams become high and the color is reproduced in a wider range.

However, as is apparent from the comparison between the outgoing angle β of the beams from the LCD 40 shown in FIG. 6B, i.e., the projection-type color LCD disclosed in Japanese Patent Application No. 5-328805 and the outgoing angle α of the beams from the LCD 30 shown in FIG. 6A, i.e., an LCD in which each microlens 37a is arranged so as to correspond to each pixel 34, the outgoing angle β is considerably larger than the outgoing angle α. This is because each microlens 47a is associated with a set of pixels 44R, 44G and 44B corresponding to a set of R, G and B in the LCD 40. Therefore, in the projection-type color LCD disclosed in Japanese Patent Application No. 5-328805, it is necessary to use a projection lens having a pupil 51 with a large aperture (or a low F value) as shown in FIG. 9 in order to project all the outgoing beams from the LCD 40 onto the screen. However, as the F value of a projection lens is reduced, it becomes increasingly difficult to produce such a projection lens, so that the necessary cost becomes disadvantageously high.

Nevertheless, if in order to reduce the cost, a projection lens has an F value larger than the necessary F value, i.e., a projection lens having a pupil 50 with a small aperture; then an eclipse of the R and B beams is undesirably generated in the portions of the projection lens having a pupil 50 with a small aperture as indicated by the hatching in FIG. 9. As a result, the amount of these two beams reaching the screen is adversely reduced. In the case of using light sources generally-used for a liquid crystal projector, e.g., a metal halide lamp, a halogen lamp and the like, the emission spectra of these lamps do not have uniform intensity distribution. More specifically, since no emission line exists in a red region of the emission spectrum of a metal halide lamp, the intensity of the red light is weak. On the other hand, in a halogen lamp, the intensity of the blue light is weak. Accordingly, if a projection lens having a pupil 50 with a small aperture and the above-mentioned lamps are used in accordance with the method disclosed in Japanese Patent Application No. 5-328805, then the resulting white balance is largely shifted to a G side. This is because the intensities of the R or B beams, respectively, emitted from these lamps are weak, and in addition, the eclipse is generated in the portions of the pupil 50 of the projection lens, thereby further weakening the intensities of these beams.

That is to say, the present inventors have found that the method disclosed in Japanese Patent Application No. 5-328805 has a disadvantage in that the white balance is degraded because of the generation of the eclipse in the portions of the pupil 50 of the projection lens, if the emission spectrum of the light source do not have uniform intensity distribution and a projection lens having an F value larger than the necessary F value is used in order to reduce the cost.

SUMMARY OF THE INVENTION

The projection-type color display device of this invention, includes: a white light source; a splitting means for splitting white light emitted from the white light source into a first, a second, and a third beam having respectively different wavelength regions; a modulation means for modulating the first, the second and the third beams; an irradiation means for irradiating the first, the second and the third beams onto a principal surface of the modulation means at respectively different angles; and a projection means for projecting the first, the second and the third beams modulated by the modulation means, wherein the first beam includes a color beam having a weakest intensity among the beams in three primary colors contained in the white light; and a direction of the first beam incident onto the principal surface of the modulation means is closer to a normal of the principal surface of the modulation means as compared with the second and the third beams.

In one embodiment of the present invention, the modulation means includes a first, a second and a third pixel and a microlens disposed so as to correspond to the first, the second and the third pixels; the first, the second and the third beams are irradiated onto the microlens at respectively different angles; and the first, the second and the third beams are incident onto the first, the second and the third pixels, respectively.

In another embodiment of the present invention, the projection means is a projection lens having an F value of a number N, and the number N is larger than $1/(2 \cdot \tan \theta'_{max})$, where $\theta'_{max}$ is a maximum angle of the beam outgoing from the modulation means.

In still another embodiment of the present invention, the white light source is a metal halide lamp, and the first beam is red, the second beam is blue and the third beam is green.

In still another embodiment of the present invention, the white light source is a halogen lamp, and the first beam is blue, the second beam is red and the third beam is green.

In still another embodiment of the present invention, the splitting means includes a first, a second and a third dichroic mirror; the first dichroic mirror receives the white light and reflects at least one of the second and third beams; the second dichroic mirror receives light transmitted through the first dichroic mirror and reflects the first beam; and the third dichroic mirror receives light transmitted through the second dichroic mirror, reflects one of the second and third beams, which has transmitted the second dichroic mirror, and functions as the irradiation means.

In a single-panel projection-type color display device according to the present invention, the respective beams in the three primary colors of R, G and B are incident onto a common liquid crystal display device at the angles which are different from each other; these beams are optically modulated by using the pixels corresponding to the respective color beams; and then the transmitted beams are projected, thereby displaying a color image on a screen. In the case of using a projection lens having a pupil with a small aperture (or a high F value) in order to reduce the cost, the projection-type color display device of the invention can eliminate the eclipse of a color beam, the amount of which is the smallest among the color beams of the three primary colors, from a portion of the pupil of the projection lens by making the incident angle of the color beam having the weakest emission intensity onto the LCD closest to the normal of the display panel of the LCD, so that a satisfactory white balance can be maintained. In addition, since it is possible to improve the color purity of the color beam, the colors can be reproduced in a wider range, and a brighter image can be obtained.

Thus, the invention described herein makes possible the advantage of providing a projection-type color display device allowing for eliminating the degradation in the white balance even if the emission spectrum of a light source does not have a uniform intensity distribution and if a projection lens having an F value larger than the necessary F value is used; realizing a satisfactory color reproducibility; and considerably reducing the cost.

This and other advantages of the present invention will become apparent to those skilled in the art upon reading and understanding the following detailed description with reference to the accompanying figures.

BRIEF DESCRIPTION OF THE DRAWINGS

FIG. 5 is a graph showing the variation in the color splitting characteristics of the dichroic mirrors in accordance with the polarization states.

FIG. 7 shows the liquid crystal display panel of the projection-type LCD shown in FIG. 1A.

DESCRIPTION OF THE PREFERRED EMBODIMENTS

Hereinafter, the present invention will be described by way of illustrative examples with reference to accompanying drawings.

EXAMPLE 1

Figure 1:
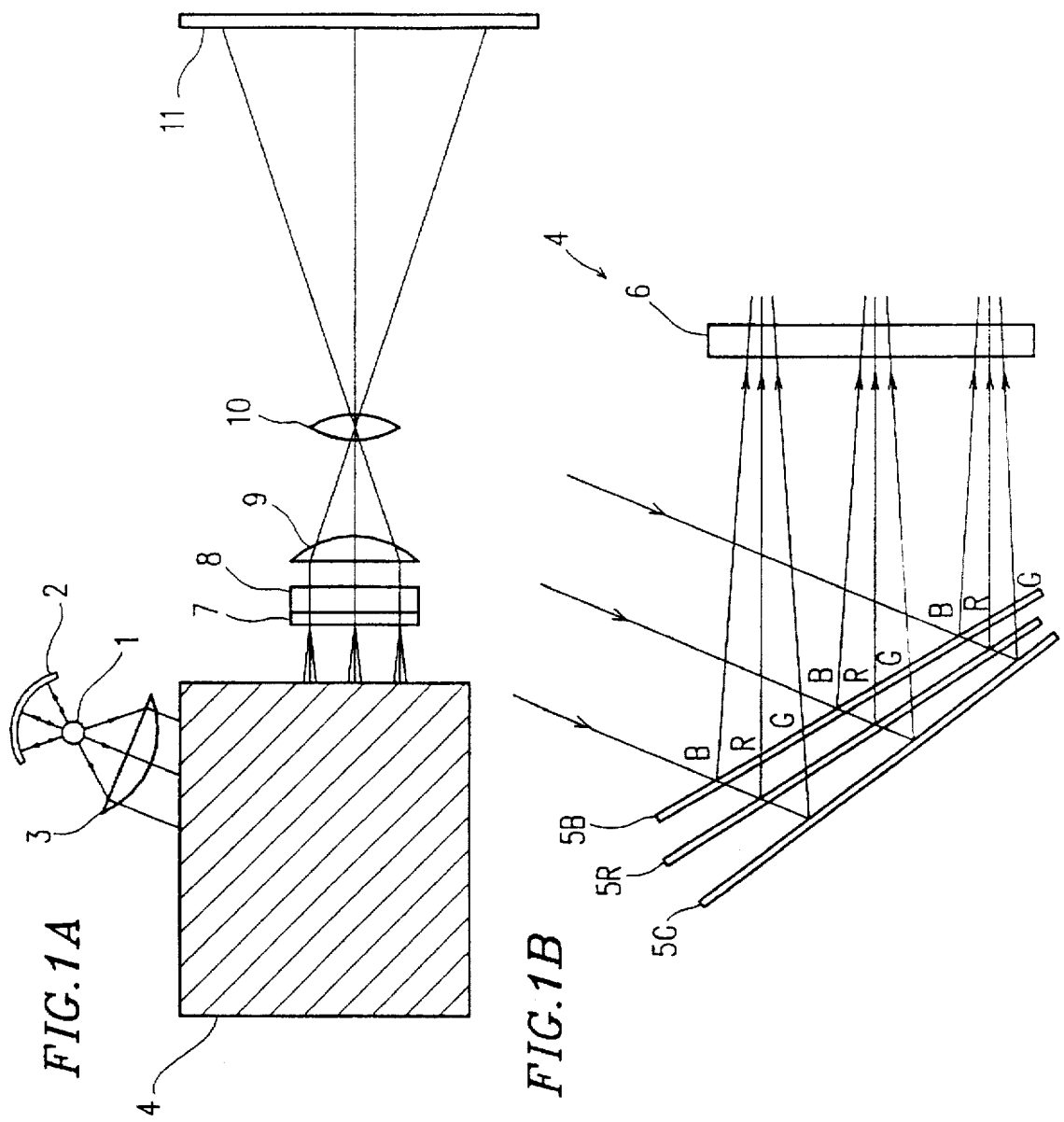
FIG. 1A schematically shows an arrangement of a projection-type color LCD according to an example of the present invention.
FIG. 1B is an enlarged view showing a color splitting optical system 4 of the projection-type color LCD shown in FIG. 1A.
Figure 2:
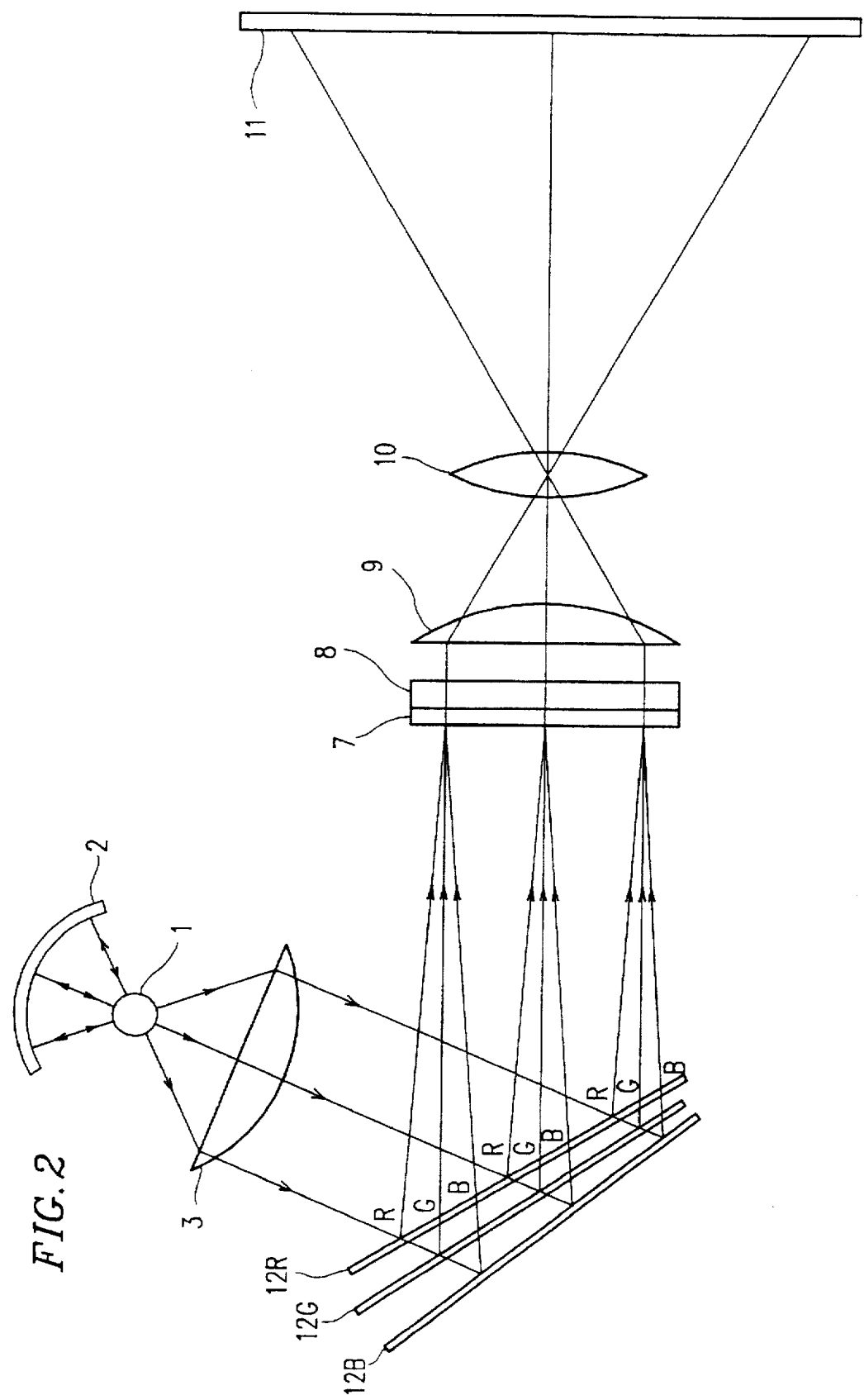
FIG. 2 schematically shows an arrangement of a conventional projection-type color LCD.

FIG. 1A schematically shows an arrangement of a projection-type color display device according to an example of the present invention. FIG. 1B is an enlarged view showing a color splitting optical system 4 in FIG. 1A.

Figure 10:
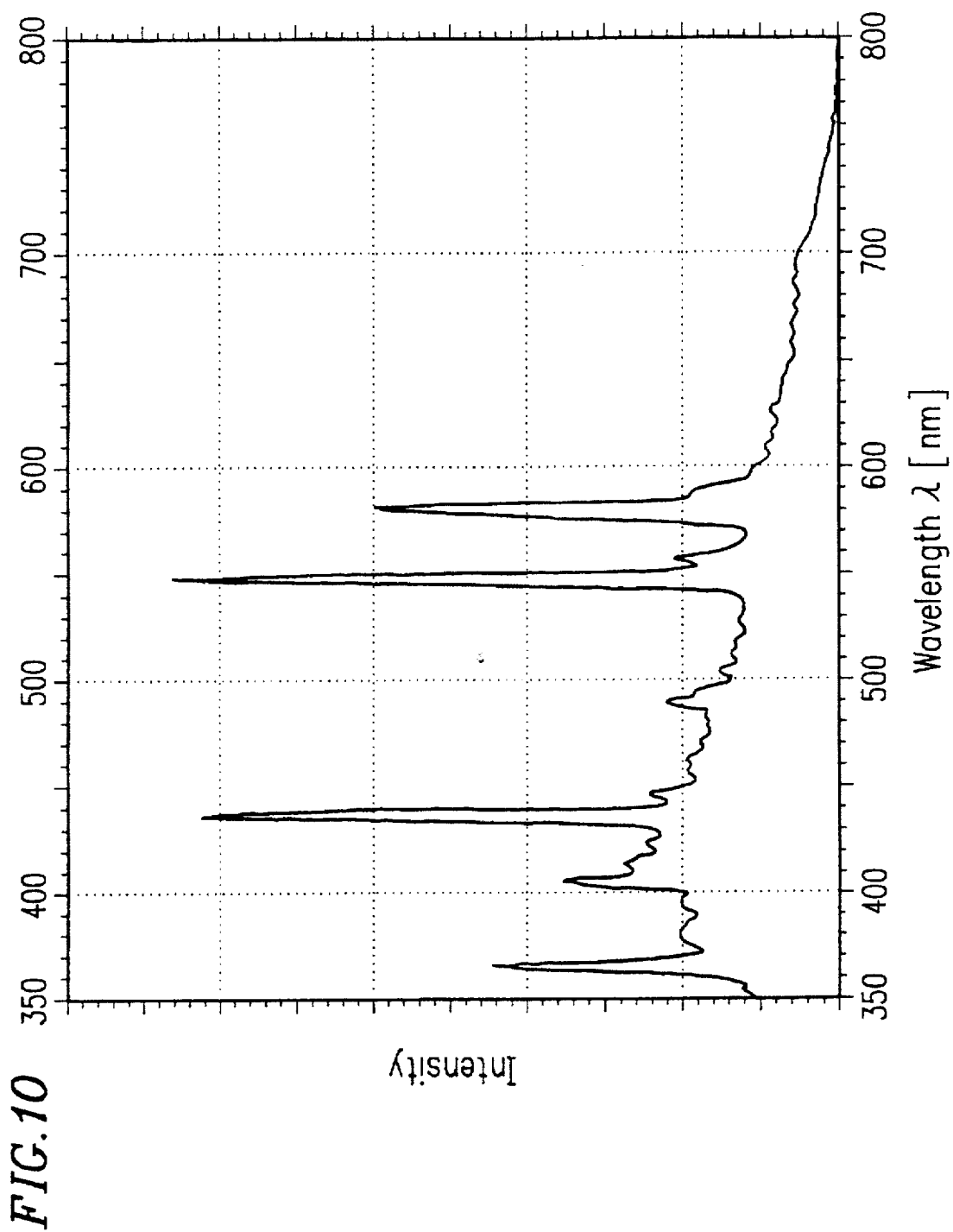
FIG. 10 shows an emission spectrum of the light emitted from a metal halide lamp used in the first example.

In this example, a metal halide lamp having a power of 150 W, an arc length $A_L$ of 5 mm, an arc diameter $A_\phi$ of 2.2 mm and an emission spectrum distribution shown in FIG. 10 is used as a white light source 1. The white light source 1 is disposed so that the longitudinal direction of the cylindrical arc is vertical to the paper sheet of FIG. 1A. In place of the metal halide lamp, a halogen lamp, a xenon lamp or the like can also be used as the white light source 1.

A spherical mirror 2 is disposed behind the white light source 1 so that the center of the spherical mirror 2 is aligned with the center of the emission portion of the white light source 1. A condenser lens 3 having an aperture of 80 mm$\phi$ and a focal length $f_c$ of 60 mm is disposed in front of the white light source 1 so that the focal point of the condenser lens 3 is aligned with the center of the emission portion of the white light source 1. By using such an arrangement, substantially collimated white light beams can be obtained through the condenser lens 3.

In this case, the respective beams are substantially collimated but deviate from the longitudinal direction of the arc (or a direction vertical to the paper sheet of FIG. 1A) by about ±2.4 degrees (herein, the deviation amount will be called a "collimation degree". In this case, the collimation degree $\theta_{wL}=\pm\tan^{-1}(A_L/2f_c)$), and the collimation degree $\theta_{w\phi}$ in the diameter direction of the arc (or the direction parallel to the paper sheet of FIG. 1A) is about ±1 degree (i.e., $\theta_{w\phi}=\pm\tan^{-1}(A_\phi/2f_c)$).

In order to obtain collimated beams from the white light source 1, not only the above mentioned arrangement but also an arrangement in which a rotational parabolic mirror is used, an arrangement in which a rotational ellipsoidal mirror and an integrator are simultaneously used, and the like, are appropriately selected.

An optical system 4 as shown in FIG. 1B is disposed in front of the condenser lens 3. The optical system 4 consists of three kinds of dichroic mirrors (or beam splitting elements) 5B, 5R and 5C, which are disposed at different angles with respect to the beams incident through the condenser lens 3. These dichroic mirrors 5B, 5R and 5C are formed by a known thin film deposition technique.

Figure 3:
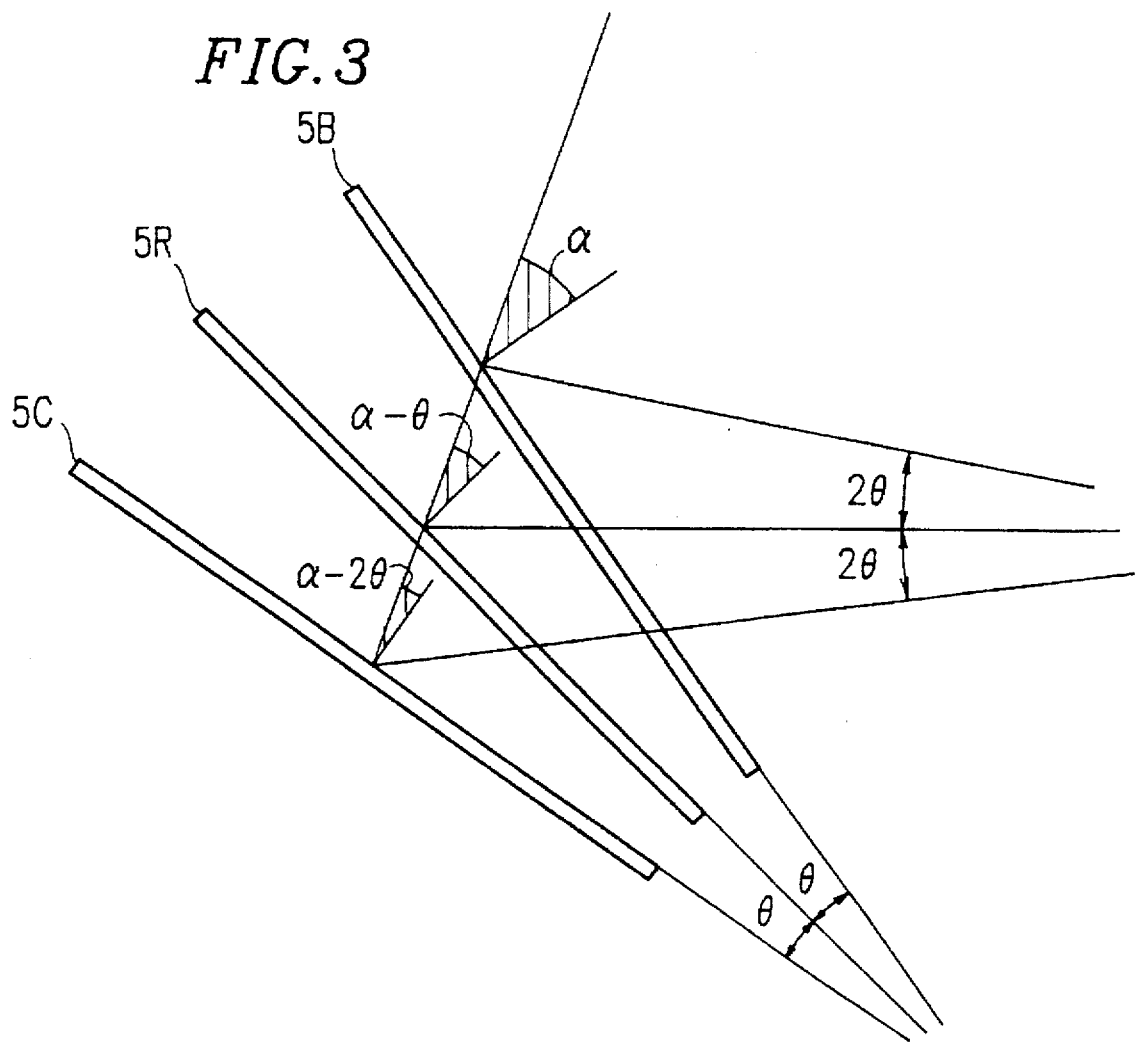
FIG. 3 shows the configuration of the dichroic mirrors with respect to an incident light beam in the example according to the present invention.
Figure 4A:
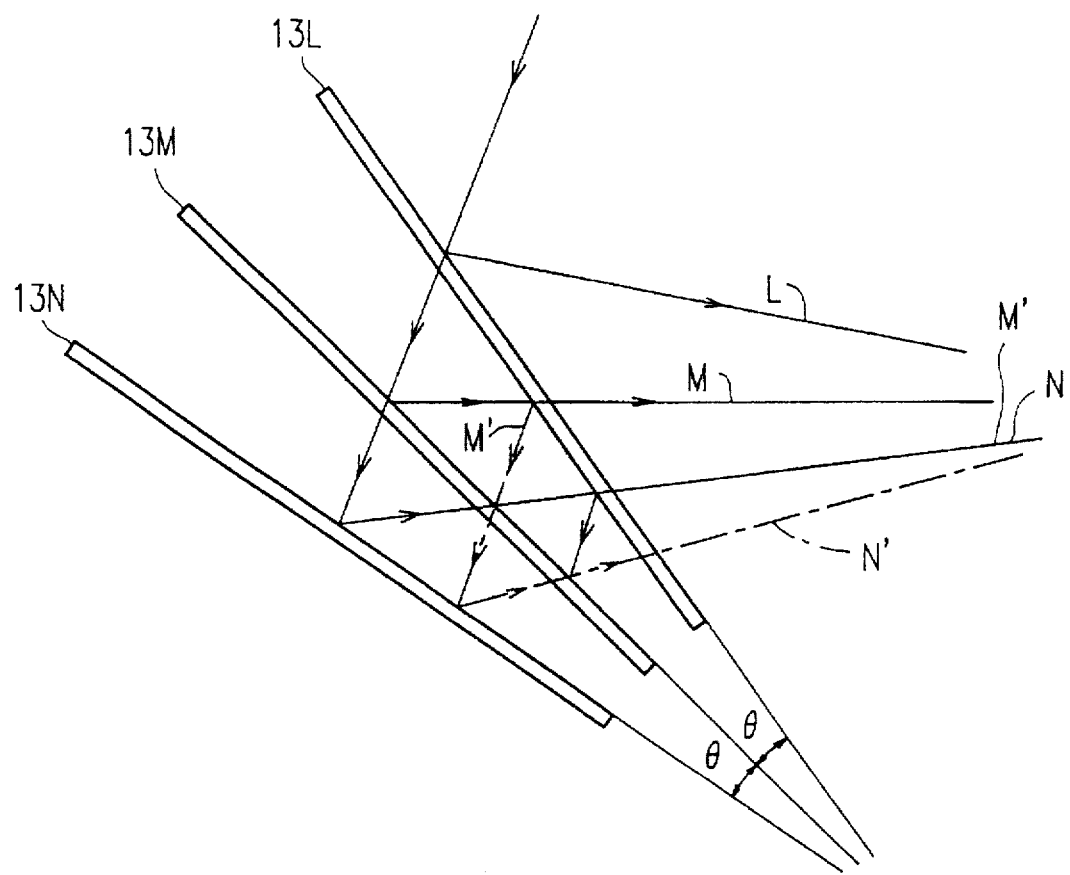
FIGS. 4A and 4B show a color mixing state in a projection-type color LCD.
Figure 4B:
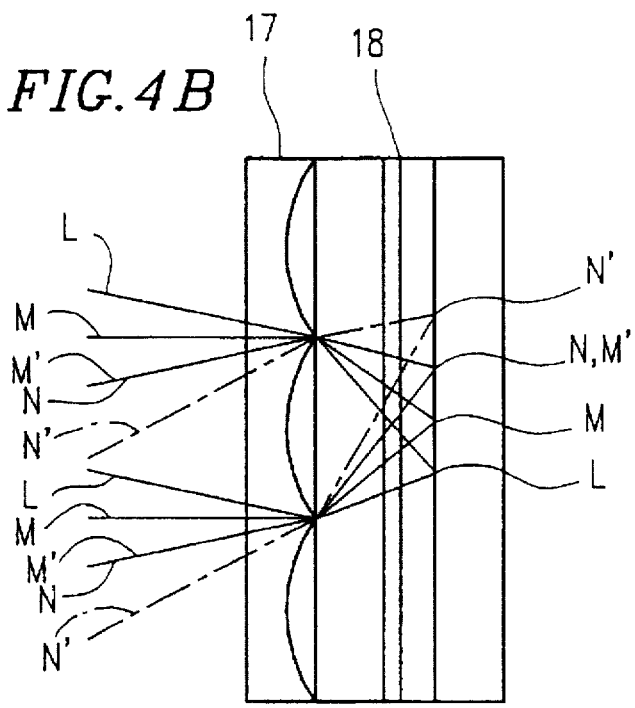
Figure 6A:
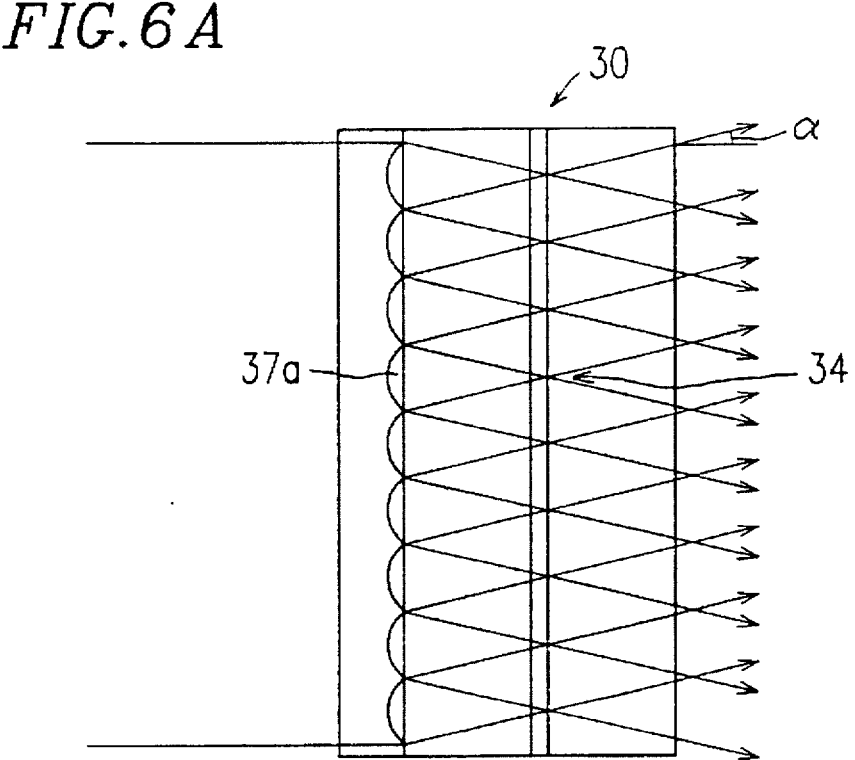
FIG. 6A shows the outgoing angles of the light from a liquid crystal display panel where each microlens corresponds to each pixel.
Figure 6B:
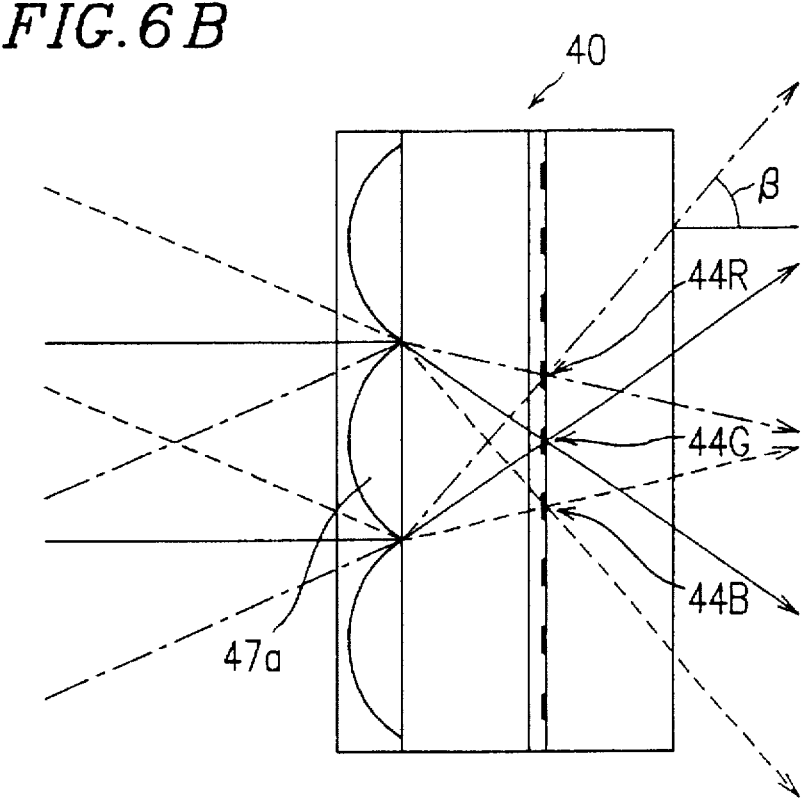
FIG. 6B shows the outgoing angles of the light from a projection-type color LCD disclosed in Japanese Patent Application No. 5-328805.

FIG. 10 shows an emission spectrum of the light emitted from the metal halide lamp used in this example. Since the intensity of the red light emitted from this white light source 1 is weak, the white light source 1 is disposed so that the red beam is incident at an angle closest to the normal of the display panel of the LCD among the three beams in the three primary colors to be incident onto the LCD panel. As shown in FIG. 3, the dichroic mirrors 5B, 5R and 5C are disposed so that the angles of $\alpha$, $\alpha-\theta$, and $\alpha-2\theta$, are respectively formed between the normal of each beam and the optical axis of the light emitted from the white light source 1. The angle $\alpha$ is set to be in an approximate range of 30 to 60 degrees, and $\theta$ is determined by a pixel arrangement pitch P of the LCD 8 and a focal length $f_\mu$ of the microlens array 7, as will be described later.

The dichroic mirrors 5B, 5R and 5C have characteristics of selectively reflecting the color beams of blue (B), red (R) and cyan (C, or blue and green) in respectively predetermined wavelength bands, and transmitting the color beams in the other wavelength bands, and are arranged on the optical axis of the light emitted from the light source in this order from the light source side. Herein, the wavelength bands of B, G and R are wavelength bands having an approximate wavelength range of 400 to 495 nm, 495 to 600 nm, and 600 to 700 nm, respectively. However, if all the color beams in these wavelength bands are utilized, then the illuminance of the image displayed on the screen becomes high but the color purities of the respective primary colors are degraded. Accordingly, in the case where the color purities are significant, the color beams in the wavelength band around 495 nm and 575 nm are sometimes cut. By using this arrangement, the light emitted from the light source is split into the color beams of B, R and G. The green beam is generally split by using a dichroic mirror for reflecting a green beam. However, if the wavelength selectivities of the dichroic mirrors 5B and 5R for reflecting respectively the blue beam and the red beam on the light source side are high (i.e., the transmittance in the transmission region is approximately 100%; the transmittance in the reflection region is approximately 0%; and the light is abruptly split into the two color beams in the boundary region), desirable effects can be obtained by using a dichroic mirror for reflecting a cyan (or blue and green) beam. If such a dichroic mirror for reflecting a cyan beam is used, then the following advantages can be obtained.

(1) Since the total number of the necessary thin films to be used for producing the dichroic mirror can be smaller as compared with the case of using a dichroic mirror for reflecting a green beam, the dichroic mirror can be produced more easily and the cost can be reduced.

(2) As the dichroic mirror for reflecting a green beam is a band cut filter, it is difficult to produce a dichroic mirror exhibiting excellent spectral characteristics. On the other hand, since the dichroic mirror for reflecting a cyan beam is a high-pass filter, it is easy to produce a dichroic mirror having a high wavelength selectivity.

In order to use a dichroic mirror for reflecting a cyan beam, the light beams in the boundary region between blue and green and in the boundary region between red and green are supposed to be split abruptly by the dichroic mirrors 5B and 5R for respectively reflecting the blue and red beams. As for the dichroic mirror 5R for reflecting the red beam on which natural light (unpolarized light) is incident, it is difficult to reduce the rise width, indicating the abruptness of the characteristics, to 40 nm or less. It is noted that the "rise width" herein refers to the difference between the wavelength where the relative transmittance is 10% and the wavelength when the transmittance is 90%. The reason why it is difficult to reduce the rise width to 40 nm or less lies in the disaccord of the spectral characteristics with respect to the P-polarized light (or the light where an electric field oscillates in a direction parallel to the paper sheet of FIG. 1A) and the S-polarized light (or the light where an electric field oscillates in a direction vertical to the paper sheet of FIG. 1A). Therefore, if the light incident on a dichroic mirror is limited to be either an S-polarized light or a P-polarized light, then the spectral characteristics are expected to be improved. In the case of using the components of the S-polarized light or the P-polarized light in place of the natural light, it is possible to reduce the rise width to about 20 nm while using a practical number of films.

FIG. 5 shows the relationship between the transmittance and the wavelength. In FIG. 5, the solid line indicates the transmittance characteristics of the P-polarized light components with respect to the dichroic mirror for reflecting the red light when the mirror is designed to utilize the P-polarized light, while the broken line indicates the transmittance characteristics of the natural (or unpolarized) light with respect to the dichroic mirror for reflecting the red light when the mirror is designed to utilize the natural light. As is apparent from FIG. 5, if the polarization state is defined, the transmittance characteristics become more abrupt as compared with the case of using a dichroic mirror designed to utilize natural (or unpolarized) light. It is possible to design the dichroic mirror for utilizing only the S-polarized light so as to have the spectral characteristics substantially equivalent to those of the dichroic mirror for utilizing only the P-polarized light shown in FIG. 5.

Figure 11A:
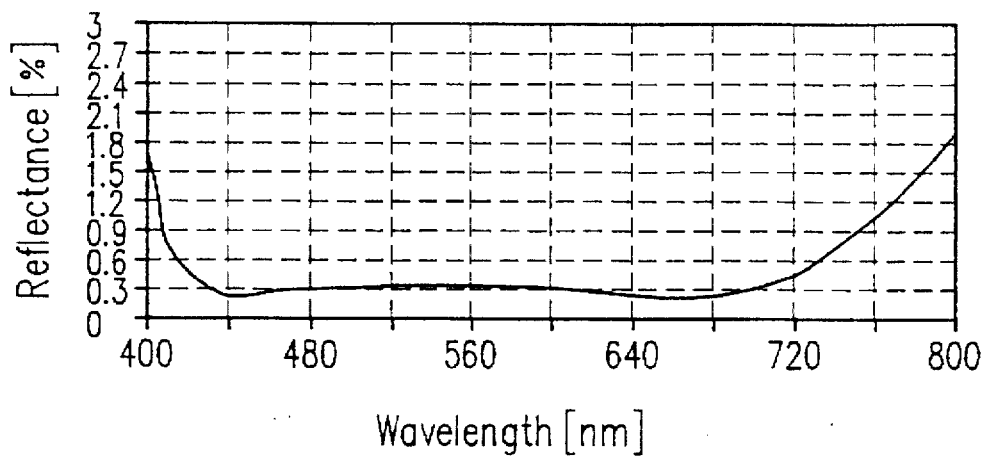
FIG. 11A is a graph showing the spectral reflectance of an antireflection film provided on the reverse side of the dichroic mirrors.
Figure 11B:
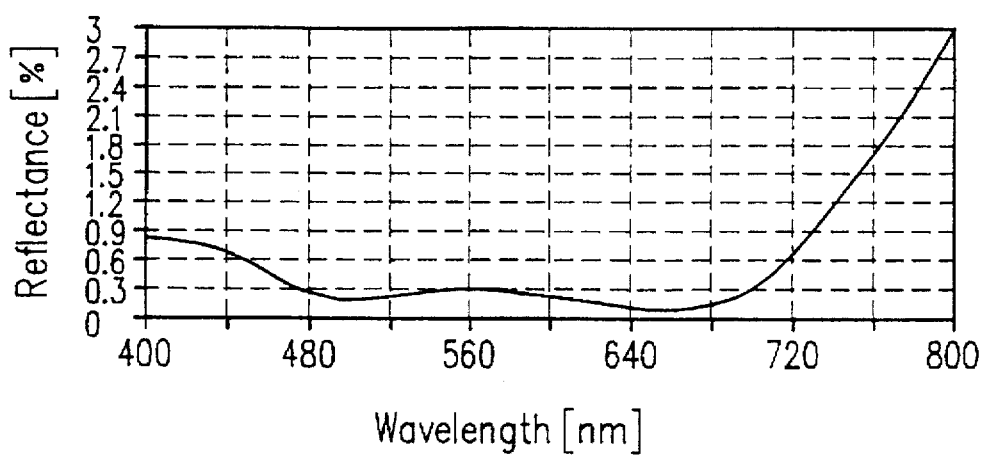
FIG. 11B is a graph showing the spectral reflectance of another antireflection film provided on the reverse side of the dichroic mirrors.
Figure 11C:
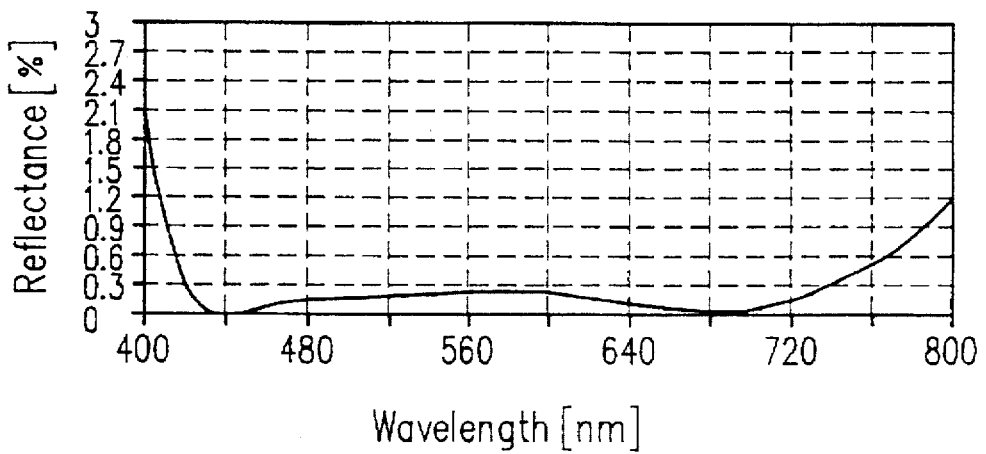
FIG. 11C is a graph showing the spectral reflectance of still another antireflection film provided on the reverse side of the dichroic mirrors.

The wavelength selectivities of the dichroic mirrors for reflecting the other color beams can also be improved in the same way as the dichroic mirror for reflecting the red beam by defining the polarization states. In the case where no treatment is applied to the reverse side of the dichroic mirror, or the side which is not used for splitting the light into the color beams, unnecessary reflection is caused in the boundary between the glass substrate and the air, and the color splitting characteristics are degraded. In order to prevent such degradation, an antireflection film is provided. The antireflection film is formed by alternately depositing $SiO_2$ films and $TiO_2$ films by an electron beam evaporation method. The antireflection film has a multi-layered structure consisting of the following five layers: an $SiO_2$ film (thickness: 34.8 nm), a $TiO_2$ film (thickness: 15.6 nm), an $SiO_2$ film (thickness: 34.8 nm), a $TiO_2$ film (thickness: 123.7 nm), and an $SiO_2$ film (thickness: 92.3 nm). These films are deposited by setting the temperature of the substrate in an approximate range of 300° to 350° C. By forming this antireflection film, it is possible to considerably reduce the amount of the light reflected by the reverse side. More specifically, in the case where the antireflection film is not formed, approximately 4% of the light is reflected by the reverse side. On the other hand, in the case where the antireflection film is formed, the proportion of the light reflected by the reverse side can be reduced to an approximate range of 0.2 to 0.8%, as shown in FIG. 11B. The structure of the antireflection film is not limited to that described above. If the structure of the film is changed, then the characteristics as shown in FIGS. 11A and 11C can also be obtained. More specifically, if the antireflection film has a three-layered structure consisting of an MgO film (thickness: 80 nm), a $TiO_2$ film (thickness: 120 nm) and an $SiO_2$ film (thickness: 94 nm), then the characteristics as shown in FIG. 11A can be obtained. Moreover, if the antireflection film has a seven-layered structure consisting of an $SiO_2$ film (thickness: 23.5 nm), a $TiO_2$ film (thickness: 18.7 nm), an $SiO_2$ film (thickness: 47 nm), a $TiO_2$ film (thickness: 63.7 nm), an $SiO_2$ film (thickness: 23.5 nm), a $TiO_2$ film (thickness: 46.8 nm) and an $MgF_2$ film (thickness: 122.5 nm), then the characteristics as shown in FIG. 11C can be obtained.

In this example, a dichroic mirror which is supposed to utilize only the P-polarized light components is used. As a result, the amount of the light outgoing from the dichroic mirror is reduced to one half of the amount of the light outgoing from the dichroic mirror used for utilizing the natural light. However, in the modes where linearly polarized light is utilized such as a twisted nematic (TN) mode or a super twisted nematic (STN) mode, a half amount of the total light is absorbed or reflected by a polarizer when the light is incident onto an LCD. Therefore, even if the polarization state is defined when the light leaves the dichroic mirror, the amount of the light when the light leaves the projection lens is not reduced.

The P-polarized light components oscillate in the direction parallel to the paper sheet of FIG. 1A and vertical to the propagation direction of the light, while the transmission axis of a polarizer on the light incoming side of an LCD is generally disposed so as to be parallel or vertical to the rubbing direction of the liquid crystal layer. The direction of the transmission axis of the polarizer is determined so that the optimal viewing direction of an LCD lies in a twelve o'clock direction or in a six o'clock direction of the display panel. Accordingly, the direction of the transmission axis is set so as to be inclined by 45 degrees with respect to the twelve o'clock direction or the six o'clock direction of the display panel, and therefore is often different from the polarization direction of the P-polarized light. In order to align these two directions, according to the invention, a half-wave plate 6 is disposed between the dichroic mirrors 5B, 5R and 5C functioning as color splitting elements and the LCD 8 as shown in FIG. 1B. The half-wave plate 6 is an optical member made of a birefringent material and can rotate the polarization direction. By disposing this half-wave plate 6, it is possible to rotate the P-polarized components of the respective color beams reflected by the dichroic mirrors 5B, 5R and 5C and align the polarization direction with the direction of the transmission axis of the polarizer on the light incoming side of the LCD 8. In the case where the natural light is incident onto the dichroic mirrors, since the polarized components to be used can be determined by the polarizer on the light incoming side of the LCD, it is not necessary to additionally provide a polarizer on the light incoming side of the dichroic mirrors.

FIG. 7 is a cross-sectional view schematically showing the microlens array 7 and the LCD 8 used in this example. A polarizer, an alignment film and the like for constituting the LCD 8 are not shown in FIG. 7 for simplification. The color beams in R, G and B are transmitted through the half-wave plate 6 and then incident onto the microlens array 7 at respectively different angles. In this example, the red beam is assumed to be incident vertically onto the microlens array 7, and the green and blue beams are assumed to be incident at respective angles so as to be symmetric to the red beam, or the normal of the LCD 8 as shown in FIG. 7.

As shown in FIG. 7, the LCD 8 includes: a pair of glass substrates 20 and 22 (thickness: 1.1 mm$^t$): liquid crystal layer 23 formed by injecting the liquid crystal between the pair of substrates 20 and 22; strip-shaped signal electrodes 24R, 24G and 24B provided on the internal surface of the substrate 22 facing the liquid crystal layer 23 so as to drive the liquid crystal in a simple matrix fashion; and a scanning electrode 21 provided on the internal surface of the substrate 20 facing the liquid crystal layer 23 so as to cross the strip-shaped signal electrodes 24R, 24G and 24B at a right angle. Each of the signal electrodes 24R, 24G and 24B and the scanning electrode 21 is formed of a transparent conductive film. The red, green and blue signals are input to the signal electrodes 24R, 24G and 24B, respectively. This example uses a simple matrix type LCD operating in a super twisted nematic (STN) mode in which the number of the scanning electrodes is 220; a scanning electrode pitch is 200 μm; the number of the signal electrodes is 600; and a signal electrode pitch is 100 μm.

A color filter layer is not provided for the LCD. However, the driving signals are applied in a stripe shape to the corresponding signal electrodes 24R, 24G and 24B so as to be vertical to the scanning electrode 21. The microlens array 7 corresponding to the signal electrodes 24R, 24G and 24B consists of a plurality of lenticular lenses in a vertical direction having a width of 300 μm. Each lenticular lens corresponds to a set of three signal electrodes 24R, 24G and 24B and consists of a plurality of hemicylindrical lenses arranged in parallel with each other. The focal length of the lenticular lens is set to be substantially equal to the thickness t of the glass substrate 20 of the LCD, e.g., 1.1 mm. If the focal length of the microlens is measured in the atmosphere, then the focal length is obtained by dividing the thickness t by the refractive index n of the glass substrate: e.g., t/n=1.1 mm/1.53=0.72 mm.

In order to produce the microlens, an ion exchange method, (Appl. Opt. Vol. 21, p.1052 (1984), or Electron. Lett. Vol. 17, p. 452 (1981)), a swelling method (Suzuki et al., "New Method for Producing a Plastic Microlens", 24th Micro Optics Conference), a thermal deformation method (Zoran D. Popovic et al., "Technique for Monolithic Fabrication of Microlens Arrays", Appl. Opt. Vol. 27, p. 1281 (1988)), a vapor deposition method (Japanese Laid-Open Patent Publication No. 55-135808), a thermal printing method (Japanese Laid-Open Patent Publication No. 61-64158), a mechanical processing, a method disclosed in Japanese Laid-Open Patent Publication No. 3-248125, and the like can be used.

If the microlens array 7 is irradiated with collimated beams from predetermined directions, then the respective beams are converged in a line in the vicinity of the light outgoing side of each lens of the microlens array 7 so as to be spaced from each other by 300 μm corresponding to the pitch of the lenticular lens. The width W of the converged line is obtained in the following manner.

$W=A_0$ (arc diameter of a light source)$\times f_\mu$ (focal length of a microlens)$/f_c$ (focal length of a condenser lens)=2.2 mm$\times$0.72 mm/60 mm=26.4 μm Accordingly, the width of the converged line can be smaller than the width of a strip-shaped signal electrode.

On the other hand, as for a relative angle between each dichroic mirror, if $P=f_\mu \times \tan \theta$ (where P is a pixel pitch, $f_\mu$ is a focal length of the microlens, and θ is a difference between the incident angles of the respective beams), then the converged line is formed at a position deviating from the first converged line by each pitch, and the converged line is included inside the next signal electrode.

In this example, the difference θ is set so as to satisfy the above equation. Therefore, $\theta=\tan^{-1}(100/720)=8°$.

Therefore, if the microlens 7 is irradiated with the collimated beams in the three primary colors from the three directions which are different from each other by 8 degrees, then the converged lines of the three primary color beams are sequentially formed on the adjacent signal electrodes so as to be spaced apart from each other by 100 μm. The respective color beams in the three primary colors are transmitted through the LCD 8 and then projected by the projection lens 10 onto the screen 11, thereby displaying a color image.

By using the above-mentioned values, the maximum outgoing angle $\theta'_{max}$ of a beam from the LCD becomes approximately 21 degrees, and a projection lens having an F value ($=1/(2 \cdot \tan \theta'_{max})$) of 1.3 or less is required to project all the outgoing beams onto the screen. Since a projection lens having an F value of 1.3 has a large aperture, it is difficult to produce such a lens and the necessary cost is high. This is why a projection lens having an F value of 1.8 is used in this example. As a result, the eclipse is generated in the G and B beams, the amount of the beams reaching the screen is reduced, and the color temperature is also slightly reduced. Nevertheless, an excellent white balance can be maintained. According to the present invention, a projection lens having an F value larger than $1/(2 \cdot \tan \theta'_{max})$ can be used advantageously, while the upper limit of the F value is preferably set so that the balance in the intensities of the R, G and B beams (or a white balance) is not significantly degraded.

For the purpose of comparison, a projection lens having an F value of 1.8 is used in the case where the incident light is split into the color beams in the order of R, G and B in accordance with the wavelength. As a result, a greenish white image is displayed on the screen and the quality of the display image has been considerably degraded.

EXAMPLE 2

In the first example, a liquid crystal display device of the invention has been described as being applied to a simple matrix type liquid crystal display device. Alternatively, the present invention is applicable to an active matrix type liquid crystal display device in a twisted nematic (TN) mode which is dynamically driven by a known thin-film transistor formed of an amorphous silicon semiconductor thin film for switching pixels arranged in a matrix fashion. In this second example, such an LCD will be described.

In this example, both the horizontal pixel pitch and the vertical pixel pitch are set to be 100 μm; the size of an aperture of a pixel is 50 μm (vertically)×70 μm (horizontally); and 270,000 pixels are arranged in a delta shape, i.e., 450 vertical pixels×600 horizontal pixels. The aperture ratio of the pixel is 35%. The light source portion and the dichroic mirrors are arranged in the same way as in the first example, while the direction of the arc of a metal halide lamp functioning as a light source is set to be parallel to the paper sheet in FIG. 1A. In the case where the pixels are arranged in a delta shape, it is not suitable to use lenticular lenses. The shape of each microlens is not necessarily required to be similar to the set of pixels corresponding to the microlens. Therefore, in this example, a microlens array where a plurality of hexagonal microlenses are densely arranged is used. The outer peripheries of spherical lenses are attached to each other so as to form the hexagonal lens.

Figure 8:
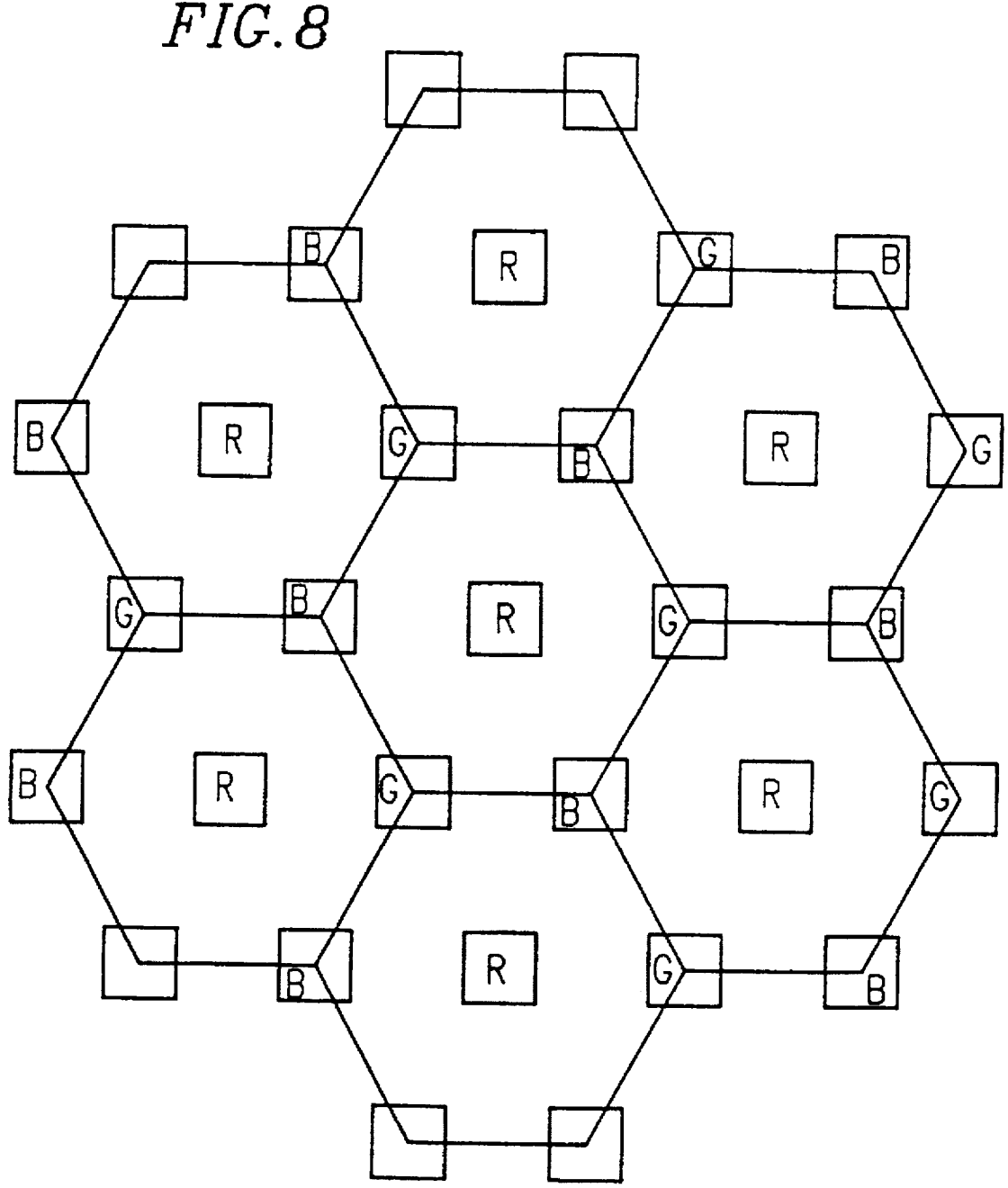
FIG. 8 shows a relative positional relationship between the respective pixels in red, green and blue arranged in a delta shape and the microlens array.
Figure 9:
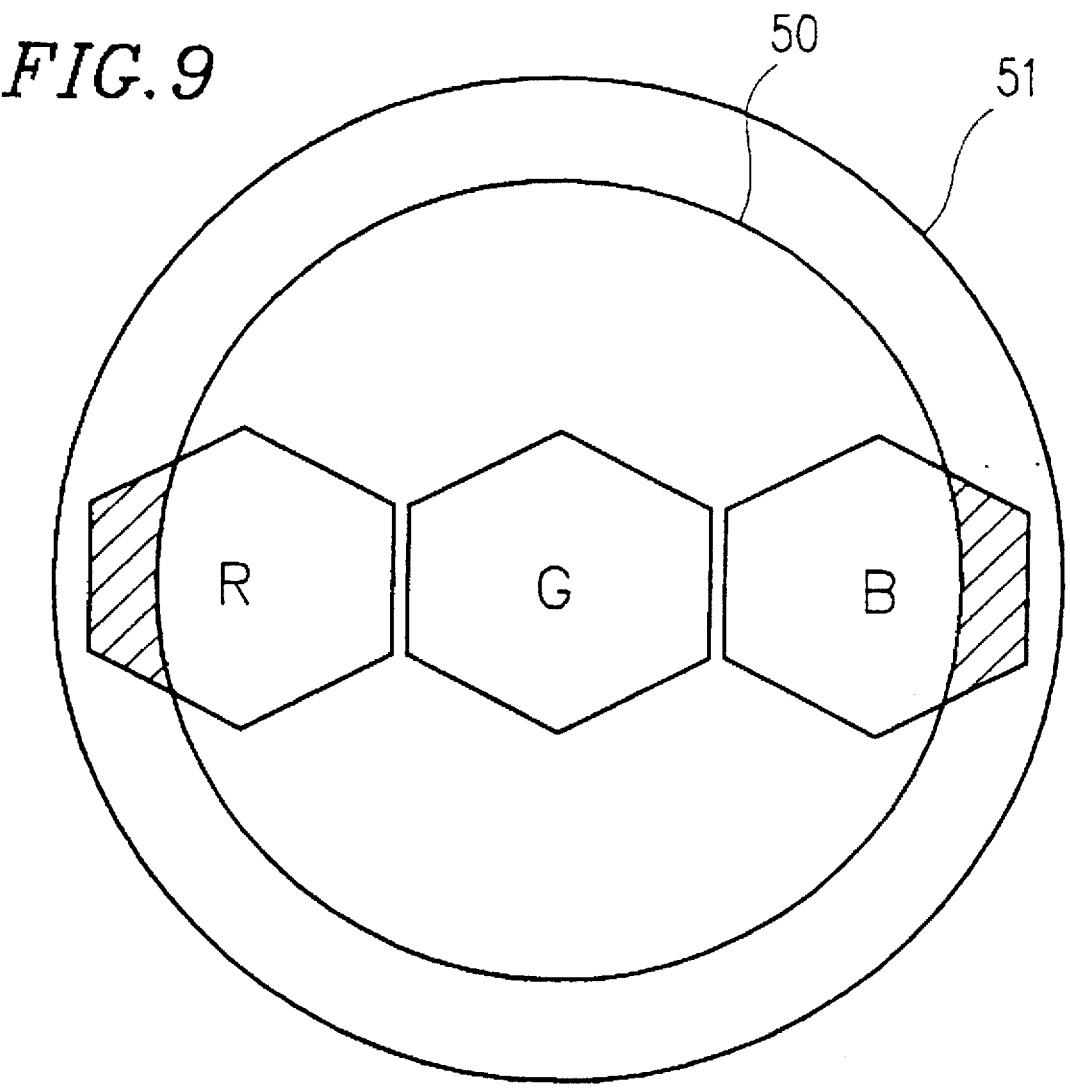
FIG. 9 shows the eclipse of the beams at the positions of the pupil of a projection lens.

FIG. 8 shows a relative positional relationship between the pixel arrangement and the microlens array. As shown in FIG. 8, sets of R, G and B pixel electrodes of a square shape are arranged in a delta shape, and the portions other than the pixel electrodes correspond to a light-shielding layer. The microlens array consists of a plurality of hexagonal microlenses in a honeycomb shape. The red beam is irradiated vertically onto the LCD and the microlens array (in FIG. 8, vertically to the paper sheet), so that a converged light spot is formed within a red pixel disposed on the optical axis of each microlens. The green and blue beams are irradiated so as to be inclined with respect to the red beam by 8 degrees in the right and left respectively, so that converged light spots in Green and blue are formed within green and blue pixels. The beams in the respective colors are converged in the respective pixels in red, green and blue, in this way- The size of the converged light spot is set to be 60 μm×26.4 μm by conducting the same calculation as that of the first example, so that the converged light spot can be included in an aperture of the pixel.

In the case of using the above-mentioned arrangement, the maximum outgoing angle of the light from the LCD becomes approximately 22 degrees, and a projection lens having an F value of about 1.2 or less is necessary. In order to reduce the cost, a projection lens having an F value of 1.8 is used in this example. As a result, the eclipse of the G and B beams is generated at the positions of the pupil of the projection lens and the amount of the beams reaching the screen is reduced. Nevertheless, an excellent white balance and color reproduction range can be obtained.

In the first and the second examples, the white light is split by the dichroic mirrors into the color beams in the three primary colors. However, the present invention is applicable to an arrangement for splitting the white light into four or more color beams. For example, the present invention can be used for conducting a graphic display.

Three dichroic mirrors are used as color splitting elements in the foregoing examples. However, a total reflecting mirror can also be used in place of the dichroic mirror 5C shown in FIG. 1B. In such a case, if the emission spectrum of the lamp includes a lot of components causing deterioration in color purity, an optical filter for cutting the deteriorating component is preferably used.

As is apparent from the foregoing description, by applying the present invention to a projection-type color liquid crystal display device, it is possible to realize a satisfactory color reproduction range and considerably reduce the cost without degrading the white balance, even if a light source having an ununiform emission spectrum and a projection lens having an F value larger than the necessary F value are used. In the above examples, as an optical modulation means, a display panel using a liquid crystal material is described. However the present invention is not limited thereto. A display panel using a material having an electro-optical property can be employed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection-type color display device comprising: a white light source; a splitting means for splitting white light emitted from the white light source into a first, a second, and a third beam having respectively different wavelength regions; a modulation means for modulating the first, the second, and third beams; the splitting means containing an irradiation means for irradiating the first, the second and the third beams onto a principal surface of the modulation means at respectively different angles; and a projection means for projecting the first, the second and the third beams modulated by the modulation means, wherein the first beam includes a color beam having a weakest intensity among the beams in three primary colors contained in the white light; and a direction of the first beam incident onto the principal surface of the modulation means is closer to a normal of the principal surface of the modulation means as compared with the second and the third beams.

2. A projection-type color display device according to claim 1, wherein the modulation means comprises a first, a second and a third pixel and a microlens disposed so as to correspond to the first, the second and the third pixels; the first, the second and the third beams are irradiated onto the microlens at respectively different angles; and the first, the second and the third beams are incident onto the first, the second and the third pixels, respectively.

3. A projection-type color display device according to claim 1, wherein the projection means is a projection lens having an F value of a number N, and the number N is larger than $1/(2\cdot\tan \theta'_{max})$, where $\theta'_{max}$ is a maximum angle of the beam outgoing from the modulation means.

4. A projection-type color display device according to claim 1, wherein the white light source is a metal halide lamp, and the first beam is red, the second beam is blue and the third beam is green.

5. A projection-type color display device according to claim 1, wherein the white light source is a halogen lamp, and the first beam is blue, the second beam is red and the third beam is green.

6. A projection-type color display device according to claim 1, wherein the splitting means includes a first, a second and a third dichroic mirror; the first dichroic mirror receives the white light and reflects at least one of the second and third beams; the second dichroic mirror receives light transmitted through the first dichroic mirror and reflects the first beam; and the third dichroic mirror receives light transmitted through the second dichroic mirror, reflects one of the second and third beams, which has transmitted the second dichroic mirror, and functions as the irradiation means.

7. A projection-type color display device, comprising:
a beam splitter, wherein the beam splitter takes white light and splits the white light into a first, a second and a third beam, wherein each split beam has different wavelength regions and exits the beam splitter at respectively different angles;
a modulator optically coupled to the beam splitter, wherein the modulator modulates the first, second and third beams;
a projection lens optically coupled to the modulator, wherein the projection lens projects the modulated first, second and third beams onto a projection display medium; and
wherein the first beam includes a color beam having a weakest intensity among the beams in three primary colors contained in the white light, and a direction of the first beam incident onto the modulation means is closer to a normal of the modulation means as compared with the second and third beams.

8. The projection-type color display device of claim 7, further comprising a white light source for providing the white light to the beam splitter.

9. The projection-type color display device according to claim 7, wherein the beam splitter comprises:

a first, a second and a third dichroic mirror;

wherein the first dichroic mirror receives the white light and reflects one of the second and third beams, and wherein the first dichroic mirror is oriented so the incident white light forms an angle $\alpha$ with a direction normal to a surface of the first dichroic mirror;

wherein the second dichroic mirror receives light transmitted through the first dichroic mirror and reflects the first beam, where the second dichroic mirror is oriented so the light transmitted through the first dichroic mirror forms a angle $\alpha-\theta$ with a direction normal to a surface of the second dichroic mirror;

wherein the third dichroic mirror receives light transmitted by the second dichroic mirror and reflects one of the second and third beams not reflected by the first dichroic mirror, where the third dichroic mirror is oriented so the light transmitted by the second dichroic mirror forms an angle $\alpha-2\theta$ with a direction normal to a surface of the second dichroic mirror, and wherein $\alpha$ is in a range between about 30° to 60° and $\theta$ is a function of a pixel arrangement pitch and a focal length of the modulator.

10. The projection-type color display device of claim 9, wherein the first, second and third dichroic mirrors have wavelength reflectance selectivities corresponding to blue, red and green light, respectively.

11. The projection-type color display device of claim 9, wherein the third dichroic mirror has a wavelength reflectance selectivity corresponding to cyan light.

12. The projection-type color display device of claim 9, further comprising an antireflection film provided on a back side of each dichroic mirror, thereby decreasing unnecessary reflection.

13. The projection-type color display device of claim 7, wherein the first, second and third beams are in wavelength bands of about 600 to 700 nm, 495 to 600 nm and 400 to 495 nm, respectively.

14. The projection-type color display device of claim 7, further comprising a half-wave plate disposed between the beam splitter and the modulator, wherein the half-wave plate aligns a polarized light component from the beam splitter with a direction of a transmission axis of the modulator.

15. The projection-type color display device of claim 7, wherein the modulator comprises:

a microlens array including a plurality of lenticular lenses; and an LCD device optically coupled to the microlens array, wherein the LCD device includes a plurality of stripe shaped electrodes corresponding to the plurality of lenticular lenses.

* * * * *